(12) United States Patent
Van Bommel et al.

(10) Patent No.: US 10,780,654 B2
(45) Date of Patent: Sep. 22, 2020

(54) IMPRINTED 3D PRINTED STRUCTURE, PRINTING METHOD, 3D ITEM AND LIGHTING SYSTEM THEREWITH

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/607,678

(22) PCT Filed: Apr. 23, 2018

(86) PCT No.: PCT/EP2018/060267
§ 371 (c)(1),
(2) Date: Oct. 23, 2019

(87) PCT Pub. No.: WO2018/197376
PCT Pub. Date: Nov. 1, 2018

(65) Prior Publication Data
US 2020/0189212 A1    Jun. 18, 2020

(30) Foreign Application Priority Data
Apr. 25, 2017  (EP) .................... 17167853

(51) Int. Cl.
B29C 69/02    (2006.01)
B29C 64/30    (2017.01)
(Continued)

(52) U.S. Cl.
CPC ............ B29C 69/02 (2013.01); B29C 59/022 (2013.01); B29C 59/026 (2013.01); B29C 64/30 (2017.08);
(Continued)

(58) Field of Classification Search
None
See application file for complete search history.

(56) References Cited

U.S. PATENT DOCUMENTS

2011/0122406 A1 *  5/2011  Khine ................... B01F 5/0647
                                                   356/301
2014/0301179 A1   10/2014  Travis et al.
(Continued)

FOREIGN PATENT DOCUMENTS

| EP | 3124217 A2 | 2/2017 |
| WO | 01/53105 A2 | 7/2001 |
| WO | 2016083181 A1 | 6/2016 |

*Primary Examiner* — Ashok Patel
(74) *Attorney, Agent, or Firm* — Daniel J. Piotrowski

(57) ABSTRACT

The invention provides a method for 3D printing a 3D item (1), the method comprising depositing during a printing stage 3D printable material (201), to provide the 3D item (1) comprising 3D printed material (202), wherein the printing stage comprises: —3D printing a first 3D printable material (201a) to provide a first 3D printed material (202a), the first 3D printable material (201a) comprising a cross-linkable material; —creating a relief structure (610) in the first 3D printed material (202a) with a tool (630); and —3D printing a second 3D printable material (201b) to provide a second 3D printed material (202b), to provide a stack (620) of (i) 3D printed material (202) comprising the first 3D printed material comprising the relief structure (610), and (ii) the second 3D printed material (202b), wherein the method further comprises: —cross-linking at least part of the first 3D printed material (202a) comprising the relief structure (610) before depositing the second 3D printable material (202b).

12 Claims, 6 Drawing Sheets

(51) Int. Cl.
*B33Y 80/00* (2015.01)
*B33Y 10/00* (2015.01)
*B29K 105/24* (2006.01)
*B29C 64/118* (2017.01)
*B29L 11/00* (2006.01)
*B29C 59/02* (2006.01)
*B33Y 40/20* (2020.01)

(52) U.S. Cl.
CPC ............... *B33Y 10/00* (2014.12); *B33Y 40/20* (2020.01); *B33Y 80/00* (2014.12); *B29C 64/118* (2017.08); *B29K 2105/24* (2013.01); *B29L 2011/0016* (2013.01)

(56) References Cited

U.S. PATENT DOCUMENTS

| | | | |
|---|---|---|---|
| 2015/0137423 A1* | 5/2015 | Ding | B29C 64/106 264/308 |
| 2016/0096318 A1 | 4/2016 | Bickel et al. | |
| 2016/0257036 A1* | 9/2016 | Fang | B29C 39/02 |
| 2016/0282338 A1* | 9/2016 | Miklas | C12M 23/16 |
| 2016/0346964 A1 | 12/2016 | Nurnberg et al. | |
| 2018/0117833 A1* | 5/2018 | Nagahari | H04N 1/40 |
| 2018/0186097 A1* | 7/2018 | Yuan | B29C 64/40 |

\* cited by examiner

IMPRINTED 3D PRINTED STRUCTURE, PRINTING METHOD, 3D ITEM AND LIGHTING SYSTEM THEREWITH

CROSS-REFERENCE TO PRIOR APPLICATIONS

This application is the U.S. National Phase application under 35 U.S.C. § 371 of International Application No. PCT/EP2018/060267, filed on Apr. 23, 2018, which claims the benefit of European Patent Application No. 17157853.5, filed on Apr. 25, 2017. These applications are hereby incorporated by reference herein.

FIELD OF THE INVENTION

The invention relates to a method for manufacturing a 3D (printed) item by means of fused deposition modeling. The invention also relates to the 3D (printed) item obtainable with such method. Further, the invention relates to a lighting system including such 3D (printed) item.

BACKGROUND OF THE INVENTION

Within the next 10-20 years, digital fabrication will increasingly transform the nature of global manufacturing. One of the aspects of digital fabrication is 3D printing. Currently, many different techniques have been developed in order to produce various 3D printed objects using various materials such as ceramics, metals and polymers. 3D printing can also be used in producing molds which can then be used for replicating objects.

The most widely used additive manufacturing technology is the process known as fused deposition modeling (FDM). FDM is an additive manufacturing technology commonly used for modeling, prototyping, and production applications. WO2016083181 discloses a method of manufacturing a 3D article by means of FDM.

FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Other terms for FDM are "fused filament fabrication" (FFF) or "filament 3D printing" (FDP), which are considered to be equivalent to FDM. In general, FDM printers use a thermoplastic filament, which is heated to its melting point and then extruded, layer by layer, (or in fact filament after filament) to create a three-dimensional object. FDM printers are relatively fast and can be used for printing complicated 3D objects.

Micro structuring with 3D printing is known in the art. US20160096318, for instance, describes a 3D printer system that allows a 3D object to be printed such that each portion or object element is constructed or designed to have a user-defined or user-selected material parameter such as varying elastic deformation. The 3D printer system stores a library of micro structures or cells that are each defined and designed to provide the desired material parameter and that can be combined during 3D printing to provide a portion or element of a printed 3D object having the material parameter. For example, a toy or figurine is printed using differing micro structures in its arms than its body to allow the arms to have a first elasticity (or softness) that differs from that of the body that is printed with micro structures providing a second elasticity. The use of micro structures allows the 3D printer system to operate to alter the effective deformation behavior of 3D objects printed using single-material.

Known methods for manufacturing a 3D item by means of fused deposition modeling do not easily (or do not allow at all) the formation of very sharp structures, such as micro structures in the (sub)micrometer range, while such structures may be desired for specific applications.

Hence, it is an object of the invention to provide a method for manufacturing a 3D item by means of fused deposition modeling, which at least partly obviates the aforementioned drawback. To achieve the aforemention object, it might be possible to use imprinting techniques. However, because FDM uses melting for the adhesion of subsequent layers the imprinted layer would get destroyed during the printing of the subsequent layer. For this purpose, we suggest amongst others employing layers which can show good adhesion but can also be cross-linked or protected so that the imprinted layer is not destroyed.

Hence, in a first aspect the invention provides a method for 3D printing a 3D item ("item" or "3D printed item") by means of fused deposition modeling, the method comprising depositing during a printing stage 3D printable material, to provide the 3D item comprising 3D printed material, wherein the printing stage comprises: 3D printing a first 3D printable material to provide a first 3D printed material, the first 3D printable material comprising a cross-linkable material; creating a relief structure (or "structure") in the first 3D printed material, especially with a tool; and 3D printing a second 3D printable material to provide a second 3D printed material, to provide a stack of (i) 3D printed material comprising the first 3D printed material comprising the relief structure, and (ii) the second 3D printed material. The method further comprises cross-linking at least part of the first 3D printed material comprising the relief structure before depositing the second 3D printable material.

With such method, it is possible to introduce a micro structure (and/or nano structure) in the 3D printed material that is permanent, and that may essentially not be affected by the further deposition of 3D printable material on the 3D printed material with the (micro) structure. Hence, the 3D printable material may conform its shape (also) to the structure (or "relief structure"). This allows the generation of structures for the prevention or detection of counterfeiting, for instruction of (invisible) trademarks, for introduction of technical structures, such as channels, etc., and e.g. for the generation of optical structures, like gratings, diffractive elements, etc. etc. For instance, the structure may be a refractive structure (e.g. a micro lens), microlens array, a pyramid structure, a saw tooth structure, a diffractive grating, a photonic structure, etc. etc. The structure may comprise a concentric lens (especially a plurality of lenses), a lenticular lens (especially a plurality of lenticular lenses), etc.

As indicated above, the invention provides a method for 3D printing a 3D item. This method includes deposition 3D printable material, which is indicated as 3D printed material upon deposition. Hence, the method comprises depositing during a printing stage 3D printable material, to provide the 3D item. The 3D item thus in fact comprising 3D printed material The printing stage comprises 3D printing first 3D printable material to provide first 3D printed material and 3D printing second 3D printable material to provide second 3D printed material. Hence, in essence the printing stage comprises providing 3D printable material. The composition thereof before the creation of the relief structure and after creation of the relief structure may differ, though the compositions may also be the same or may essentially be the same. This will be elucidated in more detail below.

The printing stage also includes creating a relief structure in the first 3D printed material, such as with a tool. The relief structure may be created in the first 3D printed material with a tool, such as by imprinting the first 3D printed material with the tool. The creation of this (micro) structure may be performed with another device, such as a micro structure providing device or (micro-) structuring device, which may comprise such tool. The creation of the structure may be executed during printing 3D printable material in already 3D printed material. Hence, the creation of the relief structure may include an interruption of the deposition process, but may also be executed during the deposition process.

The terms "micro structure" and "micro-structure" and similar terms may also refer to a plurality of (different) micro structures. Likewise, the terms "nano structure" and "nano-structure" and similar terms may also refer to a plurality of (different) nano structures. The structures are in general indicated as relief structure, and may be generated with a stamp or a needle, etc. Such methods include a physical contact of the tool with the 3D printed material. However, other methods may also be possible. For instance, the tool may include a laser device or a embossing device, such as a light embossing device. Hence, via laser etching or embossing, also the relief structure may be created. Hence, the tool may also be indicated as relief structure generating device.

Imprinting may especially be used, as with relatively small features can be obtained. Light embossing may especially be used for high reproducibility. The reproducibility may be high because of the contactless aspect of embossing.

The term "first 3D printable material" may also refer to a plurality of different first 3D printable materials. Hence, the 3D item under construction may comprise different first 3D printed materials, such as layers of different first 3D printed materials. Within at least part of the first 3D printed material the structure is generated. Thereafter or thereon, the second 3D printable material is provided (which, when deposited is further indicated as second 3D printed material).

Hence, the method provides a stack of (i) 3D printed material comprising the first 3D printed material comprising the relief structure, and (ii) the second 3D printed material.

For stability of the structure, the structure may be provided in a specific layer (of first 3D printed material), such as first 3D printed material having specific properties and/or a specific layer is applied on the structure, such as second 3D printed material having specific properties.

The method comprises cross-linking at least part of the first 3D printed material comprising the relief structure before depositing the second 3D printable material. For instance, a top layer of 3D printed material may be cross-linked. Therefore, the first 3D printable material comprises cross-linkable material, and optionally an initiator. All first 3D printable material may comprise such cross-linkable material, or only during part of the printing stage the first 3D printable material may comprise such cross-linkable material. In such embodiments, e.g. only a top layer may comprise cross-linked material. The top layer may have a thickness of e.g. at least 50 µm, such as at least 100 µm.

The method may further comprise providing a layer on at least part of the first 3D printed material comprising the relief structure before depositing the second 3D printable material. Such layer can be a protective layer. Such layer may in embodiments be a relatively thin layer. Such layer may comprise cross-linked material or polymerized material (having a composition different from the first 3D printed material). Hence, a separate layer may be provided, which may be obtained with 3D printing or with another technology, such as spraying, dipping, etc. Hence, in embodiments an intermediate layer may be provided. The layer may especially be configured to protect the relief structure. The phrase "protecting the structure" and similar terms may especially indicate that the structure is conserved. The (intermediate) layer may have a thickness selected from the range of 10 nm-1 mm, such as 100 nm-500 µm, like 1-500 µm, such as 50-500 µm. Especially, however, in embodiments the thickness of the layer may be smaller than the height differences of the structure. This may allow a better conformance to the relief structure and may prevent filling of cavities between tops. The (intermediate) layer can also be cross-linked while the first 3D printed material and second 3D printed material may (both) not be cross-linked. Of course, also one or more of the first and the second 3D printed materials may be cross-linked. Such layer may thus in embodiments comprise cross-linked material. In specific embodiments, such layer may also have reflective properties.

The method may further comprise cross-linking at least part of the second 3D printed material adjacent to the relief structure. Hence, in such embodiments the second 3D printed material is deposited on the (micro) structure, and at least part of the second 3D printable material, i.e. the material that is in contact with the (micro) structure, is cross-linked.

Note that the (micro) structure in the first 3D printed material may translate in similar shapes (or opposite shapes) in the intermediate layer and/or second 3D printed material.

Hence, in embodiments the layer thickness of the cross-linked part (of the first 3D printed material (or of the second 3D printed material)) or of the intermediate layer may e.g. be in the range of 50-500 µm.

One may use different materials as first 3D printed material and as second 3D printed material. For instance, when the first 3D printed material has a higher glass temperature than the second 3D printed material, and/or when the first 3D printed material has a higher melting temperature than the second 3D printed material, this may also allow creating a stable structure in the first 3D printed material which may essentially not deform when the second 3D printable material is provided. The difference in glass temperature (and/) or melting temperature may especially be at least 20° C., such as at least 50° C. Examples of suitable materials may e.g. be polysulfone ($T_g$=174° C.) and PMMA ($T_g$=100° C.) or e.g. polyethersulfone ($T_g$=207° C.) or poly styrene methyl methacrylate ($T_g$=90° C.). For instance, as first 3D printed material poly(ether)sulfone might be applied, and as second 3D printed material PMMA or poly styrene methyl methacrylate may be applied.

As indicated above, the relief structure may be created in different ways. For instance, one may use a (e.g. metal or ceramic) needle and write and/or draw structures in the first 3D printed material. One may also use a stamp (which may herein also be indicated as "mold"). Hence, in embodiments the method may comprise creating the relief structure in the first 3D printed material with a (e.g. metal or ceramic) stamp. Therefore, in embodiments one may use e.g. imprinting to create the relief structure.

For instance, in embodiments the mold, which has a predefined topological pattern, is brought into contact with the sample and they are pressed together under certain pressure. When heated up above the glass transition temperature of the polymer, the pattern on the mold is pressed into the softened polymer. After being cooled down, the mold may be separated from the sample and the pattern resist is left in the first 3D printed polymer.

Hence, creation of the relief structure may include heating the first 3D printed material and/or the tool. Further, when the tool is (being applied), such as when the stamp is in contact with the deposited material, cross-linking may be started. After cross-linking, the tool, such as the stamp, may be removed. In alternative embodiments, the tool is removed and cross-linking is started.

In yet other embodiments, the tool is removed, a liquid is applied to the thus formed relief structure, and e.g. cross-linking may be started. Such liquid may comprise material that form as layer on the structure, which layer is cross-linked. Alternatively or additionally, such liquid may e.g. comprise polymerizable material and/or an initiator that may partly penetrate into the first 3D printed material to cross-link at least part of the first 3D printed material, optionally due to the presence of initiator and/or polymerizable material in the first 3D printed material.

Hence, in specific embodiments the stamp may be pressed into the first 3D printed material directly after deposition of (at least part of) the first 3D printed material.

As indicated above, alternative to those physical contact methods for creating the relief structure, embossing or etching may be applied.

The creation of the relief structure may especially include the generation of one or more elevations and/or one or more indentations relative to the yet provided undisturbed 3D printed material surface. Hence, the structure may comprise one or more tops and/or one or more valleys. In general, the structure will comprise a plurality of valleys and a plurality of tops in between the valleys.

The relief structure may be a regular structure or an irregular structure. The relief structure may also be a combination of a regular structure and an irregular structure. The relief structure may include one or more domains. When the relief structure comprises a plurality of domains, one or more domains may comprise a regular structure and/or one or more domains may comprise irregular structures.

As indicated above, the relief structure may comprise one or more of cavities, prismatic indentations and/or protrusions, cubic or rectangular indentations and/or protrusions, grooves, pillars etc. The cavities, prismatic indentations and/or protrusions, cubic or rectangular indentations and/or protrusions may also be indicated as elements of the structure.

With the relief structure, as indicated above, e.g. an optical grating or an anti-counterfeiting structure may be created. The relief structure defines tops (which may also be indicated as maxima) and cavities in between, such as grooves. Hence, a (regular) structure comprising tops may automatically include one or more, especially a plurality of, valleys in between. Likewise, a (regular) structure comprising cavities may automatically include one or more, especially a plurality of, tops in between. The height differences between tops and valleys (or between tops and cavities) may be the same over the structure or may differ, e.g. may include two or more different values.

Hence, in specific embodiments the relief structure comprises a regular pattern of tops having widths (w1), having heights (h1), and having a period (p1), wherein one or more of the widths (w1), heights (h1) and period (p1) are selected from the range of 10 nm-1 mm, like 100 nm-500 µm, especially 100 nm-100 µm. For instance, the widths and period may be in the range of the wavelength of light.

Irrespective whether the relief structure comprises a regular or irregular pattern, height differences between tops and valleys may especially be in the indicated ranges of 10 nm-1 mm, like 100 nm-500 µm, especially 100 nm-100 µm. Likewise, distances between tops, or distances between valleys may also be in these ranges. Likewise, widths of elements, such as grooves, pillars, etc. may be in these indicated ranges.

Hence, the relief structure may e.g. comprise one or more of a nano structure and a micro structure. Therefore, the one or more of cavities, prismatic indentations and/or protrusions, cubic or rectangular indentations and/or protrusions, grooves, pillars, etc. etc. may have one or more dimensions in the range of 10 nm-1 mm, especially 100 nm-500 µm. The term dimension may refer to one or more of length, height, width and diameter. In regular structures, the one or more dimensions of the elements of the structure may be (essentially) the same over the structure. For instance, the height differences between tops and valleys (or between tops and cavities), which may in fact be indicated as "heights", may be the same over the structure.

When one or both of the first 3D printed and second 3D printed materials are light transmissive, especially transparent, the relief structure may be used as optical structure. Hence, in embodiments the relief structure is an optical structure.

Further, in specific embodiments one or more of the first 3D printed material and the second printed material have a transmission of at least 90%/cm, such as at least 95%/cm, 3D printed material for one or more wavelengths in the visible. Hence, the transmission through 1 cm of 3D printed material may be at least 90%, such as at least 95%. This may thus also especially imply the use of light transmissive 3D printable material. Hence, in specific embodiments one or more of the first 3D printable material and the second printable material have a transmission of at least 90%/cm, such as at least 95%/cm, 3D printable material for one or more wavelengths in the visible.

Especially in view of optical applications, the one or more of the 3D printable materials may have different optical properties. Further, as indicated above the first and the second 3D printable material may differ e.g. in glass temperature and/or melting temperature. Likewise, this will (thus) apply for the (thus deposited) first and second 3D printed material.

Therefore, in embodiments the first 3D printable material and the second 3D printable material differ in one or more of (i) index of refraction, (ii) type of scattering particles, (iii) concentration of scattering particles, (iv) type of luminescent material, (v) concentration of luminescent material, and (vi) one or more of the glass temperature and melting temperature.

In embodiments, the luminescent material may comprise an inorganic phosphor material (e.g. YAG, LuAG, etc). In embodiments the luminescent material may comprise an organic phosphor material (e.g. BASF Lumogen F305, etc.). In embodiments the luminescent material may comprise one or more of quantum dots and quantum rods. One or more different luminescent materials may be applied.

In embodiments, the scattering material may e.g. be selected from the group comprising $Al_2O_3$, $BaSO_4$, MgO, and $TiO_2$. One or more different scattering materials may be applied. Scattering particles may be used to create reflection (of light).

Optionally, an intermediate layer may also be used as reflective layer. When using different indices of refraction, also the structure may in embodiments be used as reflective layer or face.

The first and or second 3D printable material may comprise flakes, e.g. reflective flakes. Hence, thus also first and or second 3D printed material may comprise flakes, e.g. reflective flakes. Alternatively or additionally, particles with a high aspect ratio may be applied, such as at least 2, like at least 5, such as at least 10.

As indicated above, the method comprises depositing during a printing stage 3D printable material. Herein, the term "3D printable material" refers to the material to be deposited or printed, and the term "3D printed material" refers to the material that is obtained after deposition. These materials may be essentially the same, as the 3D printable material may especially refer to the material in a printer head or extruder at elevated temperature and the 3D printed material refers to the same material, but in a later stage when deposited. The 3D printable material is printed as a filament and deposited as such. The 3D printable material may be provided as filament or may be formed into a filament. Hence, whatever starting materials are applied, a filament comprising 3D printable material is provided by the printer head and 3D printed.

Herein, the term "3D printable material" may also be indicated as "printable material. The term "polymeric material" may in embodiments refer to a blend of different polymers, but may in embodiments also refer to essentially a single polymer type with different polymer chain lengths. Hence, the terms "polymeric material" or "polymer" may refer to a single type of polymers but may also refer to a plurality of different polymers. The term "printable material" may refer to a single type of printable material but may also refer to a plurality of different printable materials. The term "printed material" may refer to a single type of printed material but may also refer to a plurality of different printed materials.

Hence, the term "3D printable material" may also refer to a combination of two or more materials. In general, these (polymeric) materials have a glass transition temperature $T_g$ and/or a melting temperature $T_m$. The 3D printable material will be heated by the 3D printer before it leaves the nozzle to a temperature of at least the glass transition temperature, and in general at least the melting temperature. Hence, in a specific embodiment the 3D printable material comprises a thermoplastic polymer having a glass transition temperature ($T_g$) and/or a melting point ($T_m$), and the printer head action comprises heating the 3D printable material above the glass transition and if it is a semi-crystalline polymer above the melting temperature. In yet another embodiment, the 3D printable material comprises a (thermoplastic) polymer having a melting point ($T_m$), and the printer head action comprises heating the 3D printable material to be deposited on the receiver item to a temperature of at least the melting point. The glass transition temperature is in general not the same thing as the melting temperature. Melting is a transition which occurs in crystalline polymers. Melting happens when the polymer chains fall out of their crystal structures, and become a disordered liquid. The glass transition is a transition which happens to amorphous polymers; that is, polymers whose chains are not arranged in ordered crystals, but are just strewn around in any fashion, even though they are in the solid state. Polymers can be amorphous, essentially having a glass transition temperature and not a melting temperature or can be (semi) crystalline, in general having both a glass transition temperature and a melting temperature, with in general the latter being larger than the former.

As indicated above, the invention thus provides a method comprising providing a filament of 3D printable material and printing during a printing stage said 3D printable material on a substrate, to provide said 3D item. Materials that may especially qualify as 3D printable materials may be selected from the group consisting of metals, glasses, thermoplastic polymers, silicones, etc. Especially, the 3D printable material comprises a (thermoplastic) polymer selected from the group consisting of ABS (acrylonitrile butadiene styrene), Nylon (or polyamide), Acetate (or cellulose), PLA (poly lactic acid), terephthalate (such as PET polyethylene terephthalate), Acrylic (polymethylacrylate, Perspex, polymethylmethacrylate, PMMA), Polypropylene (or polypropene), Polystyrene (PS), PE (such as expanded-high impact-Polythene (or polyethene), Low density (LDPE) High density (HDPE)), PVC (polyvinyl chloride) Polychloroethene, etc. Optionally, the 3D printable material comprises a 3D printable material selected from the group consisting of Urea formaldehyde, Polyester resin, Epoxy resin, Melamine formaldehyde, Polycarbonate (PC), thermoplastic elastomer, etc. Optionally, the 3D printable material comprises a 3D printable material selected from the group consisting of a polysulfone.

The printable material is printed on a receiver item. Especially, the receiver item can be the building platform or can be comprised by the building platform. The receiver item can also be heated during 3D printing. However, the receiver item may also be cooled during 3D printing.

The phrase "printing on a receiver item" and similar phrases include amongst others directly printing on the receiver item, or printing on a coating on the receiver item, or printing on 3D printed material earlier printed on the receiver item. The term "receiver item" may refer to a printing platform, a print bed, a substrate, a support, a build plate, or a building platform, etc. Instead of the term "receiver item" also the term "substrate" may be used. The phrase "printing on a receiver item" and similar phrases include amongst others also printing on a separate substrate on or comprised by a printing platform, a print bed, a support, a build plate, or a building platform, etc. Therefore, the phrase "printing on a substrate" and similar phrases include amongst others directly printing on the substrate, or printing on a coating on the substrate or printing on 3D printed material earlier printed on the substrate. Here below, further the term substrate is used, which may refer to a printing platform, a print bed, a substrate, a support, a build plate, or a building platform, etc., or a separate substrate thereon or comprised thereby.

Further, the invention relates to a software product that can be used to execute the method described herein.

The herein described method provides 3D printed items. Hence, the invention also provides in a further aspect a 3D printed item obtainable with the herein described method. Especially, the invention provides a 3D item comprising 3D printed material, the 3D item comprising a stack of (i) first 3D printed material comprising a relief structure, (ii) second 3D printed material, and (iii) optionally a layer in between the first 3D printed material and the second 3D printed material; wherein (a) the first 3D printed material and second 3D printed material differ in chemical composition, or (b) when the optional layer is available, the optional layer and one or more of the first 3D printed material and the second 3D printed material differ in chemical composition.

Some specific embodiments in relation to the 3D printed item have already been elucidated below when discussing the method. Below, some specific embodiments in relation to the 3D printed item are discussed in more detail.

As indicated above, when the first 3D printable material and the second 3D printable material are essentially identical, but part of the first 3D printed material (thus after deposition of the first 3D printable material) is cross-linked, the first 3D printed material and the second 3D printed material will differ in chemical composition.

The 3D item may include first 3D printed material of which only part, especially the part comprising the relief structure is cross-linked. Therefore, as indicated above, the term "first 3D printed material" may also refer to a plurality of different first 3D printed materials. The second 3D printed material on the relief structure may in embodiments be identical to the first 3D printed material that is not cross-linked.

In embodiments, one or more of the first 3D printed material, the second 3D printed material and the optional layer comprises cross-linked material.

As indicated above, the relief structure may in embodiments comprise a regular pattern of tops having widths (w1), having heights (h1), and having a period (p1), wherein one or more of the widths (w1), heights (h1) and period (p1) may in embodiments especially be selected from the range of 100 nm-100 µm, though other dimensions may also be possible, such as up to 500 µm, like up to 200 µm.

As also indicated above, one or more of the first 3D printed material and the second printed material have a transmission of at least 90%/cm, even more especially at least 95%/cm, 3D printed material for one or more wavelengths in the visible.

Further, as also defined in relation to the method for printing 3D printable material, the first 3D printed material and the second 3D printed material differ in one or more of (i) index of refraction, (ii) type of scattering particles, (iii) concentration of scattering particles, (iv) type of luminescent material, (v) concentration of luminescent material, and (vi) one or more of the glass temperature and melting temperature.

Especially, in view of the optical applications that are possible with some embodiments of the herein described 3D item, the invention provides in a further aspect a lighting system comprising (a) a light source configured to provide light source light, especially visible light source light, and (b) an optical element comprising the 3D item as defined herein, especially such 3D item wherein one or more of the 3D printed material and/or the second 3D printed material is transmissive for light, wherein the optical element is configured to receive at least part of the light source light. The 3D item may e.g. be configured to reflect the light source light and/or to refract the light source light, and/or to optical filter the light source light, and/or to convert the light source light, and/or to absorb the light source light etc. etc. For one or more of such purposes, the relief structure may be applied, and optionally one or more functional materials comprised by the 3D printed materials, such as materials having different refractive indices or the presence of luminescent materials, etc. (see also above).

The (with the herein described method) obtained 3D printed item may be functional per se. For instance, the 3D printed item may be a lens, a collimator, a reflector, etc. The thus obtained 3D item may (alternatively) be used for decorative or artistic purposes. The 3D printed item may include or be provided with a functional component. The functional component may especially be selected from the group consisting of an optical component, an electrical component, and a magnetic component. The term "optical component" especially refers to a component having an optical functionality, such as a lens, a mirror, a light source (like a LED), etc. The term "electrical component" may e.g. refer to an integrated circuit, PCB, a battery, a driver, but also a light source (as a light source may be considered an optical component and an electrical component), etc. The term magnetic component may e.g. refer to a magnetic connector, a coil, etc. Alternatively, or additionally, the functional component may comprise a thermal component (e.g. configured to cool or to heat an electrical component). Hence, the functional component may be configured to generate heat or to scavenge heat, etc.

Returning to the 3D printing process, a specific 3D printer may be used to provide the 3D printed item described herein. Therefore, in yet a further aspect the invention also provides a fused deposition modeling 3D printer, comprising (a) a printer head comprising a printer nozzle, and (b) a 3D printable material providing device configured to provide 3D printable material to the printer head, wherein the fused deposition modeling 3D printer is configured to provide said 3D printable material, to provide an item comprising 3D printed material.

The 3D printable material providing device may provide a filament comprising 3D printable material to the printer head or may provide the 3D printable material as such, with the printer head creating the filament comprising 3D printable material. Hence, in embodiments the invention provides a fused deposition modeling 3D printer, comprising (a) a printer head comprising a printer nozzle, and (b) a filament providing device configured to provide a filament comprising 3D printable material to the printer head, wherein the fused deposition modeling 3D printer is configured to provide said 3D printable material to a substrate, to provide an item comprising 3D printed material.

Especially, the fused deposition modeling 3D printer may further comprises (c) a structuring device, such as a microstructuring device, configured for creating a relief structure in the 3D printed material after deposition of the 3D printable material. In specific embodiments, the (micro-) structuring device comprises tool, such as a stamp.

Instead of the term "fused deposition modeling (FDM) 3D printer" shortly the terms "3D printer", "FDM printer" or "printer" may be used. The printer nozzle may also be indicated as "nozzle" or sometimes as "extruder nozzle".

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
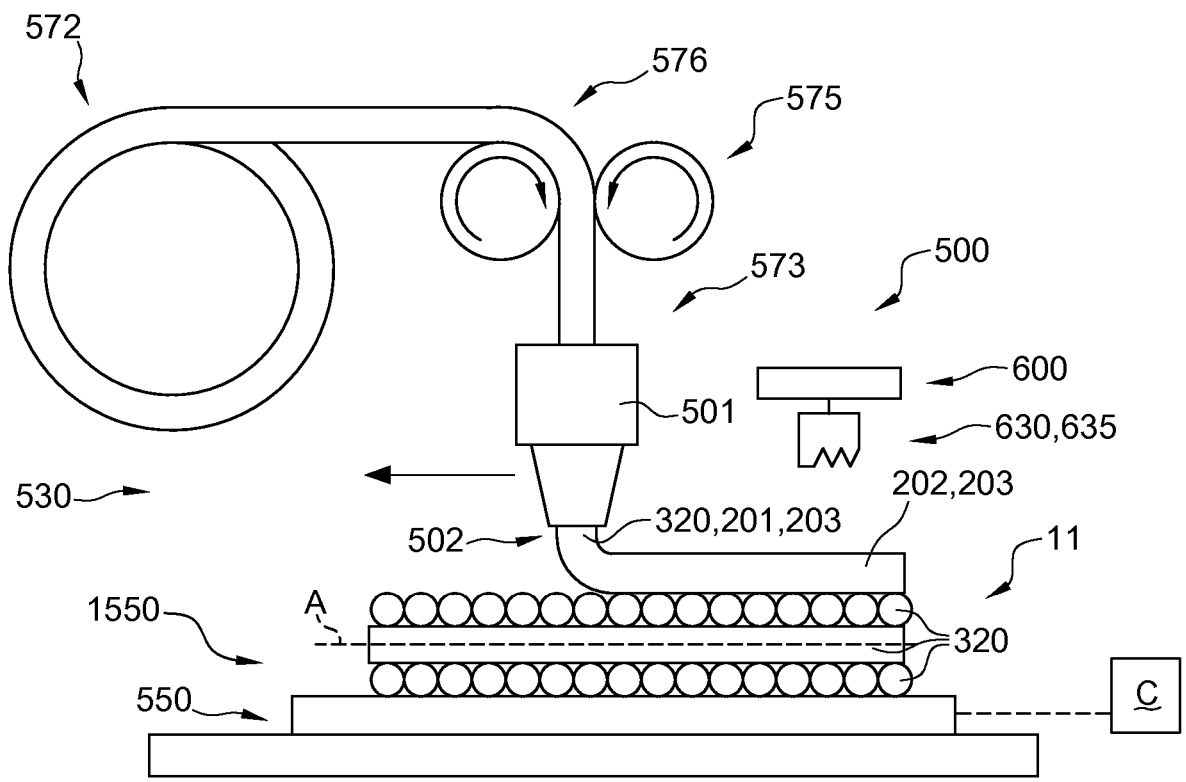
FIGS. 1a-1b schematically depict some general aspects of the 3D printer.

FIG. 1a schematically depicts some aspects of the 3D printer. Reference 500 indicates a 3D printer. Reference 530 indicates the functional unit configured to 3D print, especially FDM 3D printing; this reference may also indicate the 3D printing stage unit. Here, only the printer head for providing 3D printed material, such as a FDM 3D printer head is schematically depicted. Reference 501 indicates the printer head. The 3D printer of the present invention may especially include a plurality of printer heads, though other embodiments are also possible. Reference 502 indicates a printer nozzle. The 3D printer of the present invention may especially include a plurality of printer nozzles, though other embodiments are also possible. Reference 320 indicates a filament of printable 3D printable material (such as indicated above). For the sake of clarity, not all features of the 3D printer have been depicted, only those that are of especial relevance for the present invention (see further also below).

The 3D printer 500 is configured to generate a 3D item 10 by depositing on a receiver item 550, which may in embodiments at least temporarily be cooled, a plurality of filaments 320 wherein each filament 20 comprises 3D printable material, such as having a melting point $T_m$. The 3D printer 500 is configured to heat the filament material upstream of the printer nozzle 502. This may e.g. be done with a device comprising one or more of an extrusion and/or heating function. Such device is indicated with reference 573, and is arranged upstream from the printer nozzle 502 (i.e. in time before the filament material leaves the printer nozzle 502). The printer head 501 may (thus) include a liquefier or heater. Reference 201 indicates printable material. When deposited, this material is indicated as (3D) printed material, which is indicated with reference 202.

Reference 572 indicates a spool or roller with material, especially in the form of a wire. The 3D printer 500 transforms this in a filament or fiber 320 on the receiver item or on already deposited printed material. In general, the diameter of the filament downstream of the nozzle is reduced relative to the diameter of the filament upstream of the printer head. Hence, the printer nozzle is sometimes (also) indicated as extruder nozzle. Arranging filament by filament and filament on filament, a 3D item 10 may be formed. Reference 575 indicates the filament providing device, which here amongst others include the spool or roller and the driver wheels, indicated with reference 576.

Reference A indicates a longitudinal axis or filament axis.

Reference C schematically depicts a control system, such as especially a temperature control system configured to control the temperature of the receiver item 550. The control system C may include a heater which is able to heat the receiver item 550 to at least a temperature of 50° C., but especially up to a range of about 350° C., such as at least 200° C.

FIG. 1a also schematically depicts a structuring device 600 configured for creating a relief structure in the 3D printed material 202, especially the first 3D printable material (see further below) after deposition of the 3D printable material 201. Reference 630 indicates a tool, with which the relief structure can be created, such as a stamp 635.

Figure 1B:
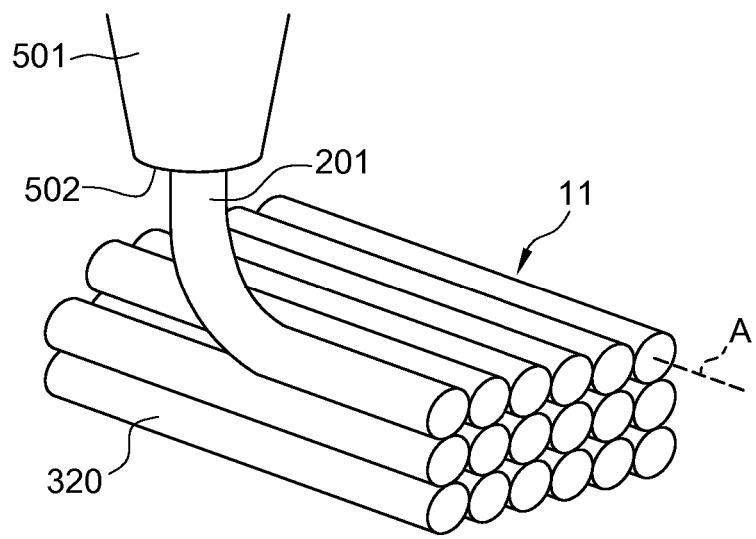

FIG. 1b schematically depicts in 3D in more detail the printing of the 3D item 10 under construction. Here, in this schematic drawing the ends of the filaments 320 in a single plane are not interconnected, though in reality this may in embodiments be the case.

Hence, FIGS. 1a-1b schematically depict some aspects of a fused deposition modeling 3D printer 500, comprising (a) a first printer head 501 comprising a printer nozzle 502, (b) a filament providing device 575 configured to provide a filament 320 comprising 3D printable material 201 to the first printer head 501, and optionally (c) a receiver item 550.

In FIGS. 1a-1b, the first or second printable material or the first or second printed material are indicated with the general indications printable material 201 and printed material 202.

In the course of the invention, see also further below, it may be desirable to provide first 3D printable material and second 3D printable material. These materials may differ in composition. However, these materials may in embodiments also be substantially identical and only differ in that the first 3D printable material (also) includes cross-linkable material. Hence, the 3D printer is especially suitable to provide different types of printable materials, including embodiments wherein the composition of the 3D printable material may be changed during printing.

Figure 1C:
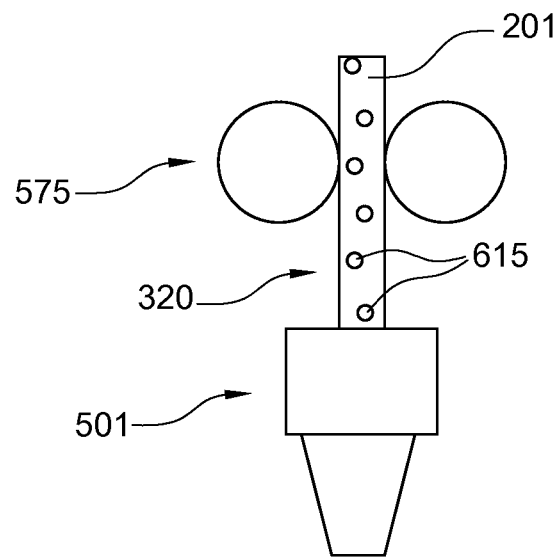
FIGS. 1c-1d schematically depict some possible variants of printer heads and supply of 3D printable material, and additives, such as cross-linkable material and/or initiator molecules to start or assist cross-linking; however, this may also apply to other additives (such as scattering particles, luminescent material, etc. etc., see elsewhere herein)

This may e.g. be done by (temporarily) providing different filaments to the printer head and/or by (temporarily) adding additives to the printer head that are mixed with the (other) 3D printable material, such as schematically depicted in FIG. 1c. Additives, such as cross-linkable material and/or initiator molecules to start or assist cross-linking, are indicated with reference 615.

Figure 1D:
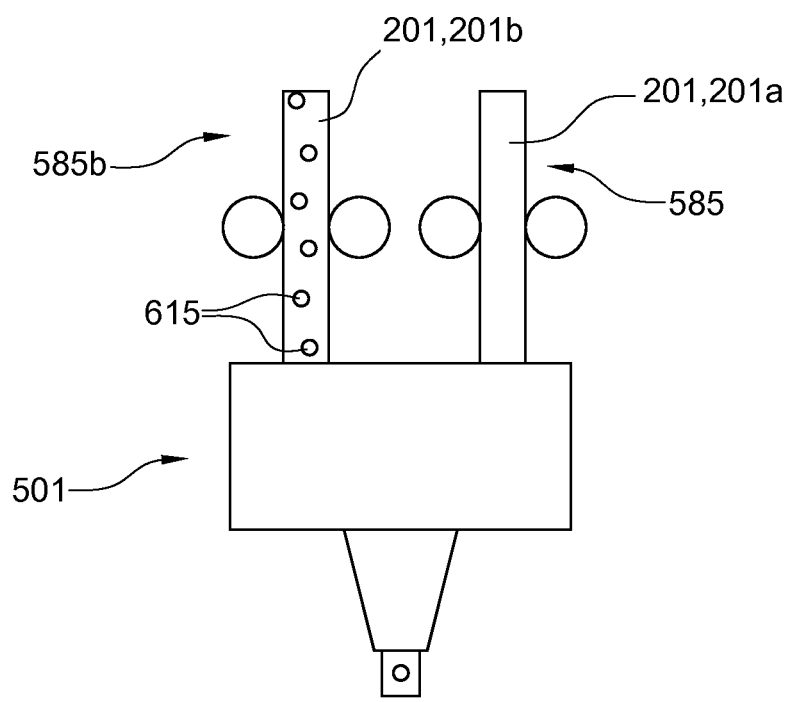

In embodiments, the method may comprise using a fused deposition modeling 3D printer, wherein the method comprises providing first 3D printable material 201a, via a first supply 585a, to a printer head 501, and providing second 3D printable material 201 comprising the additive 615, such as cross-linkable material and/or initiator molecules to start or assist cross-linking, via a second supply 585b, to the printer head 501, and controlling supply of the 3D printable materials 201a,201b, see FIG. 1d. To this end, above-mentioned control system may be applied.

Figure 1E:
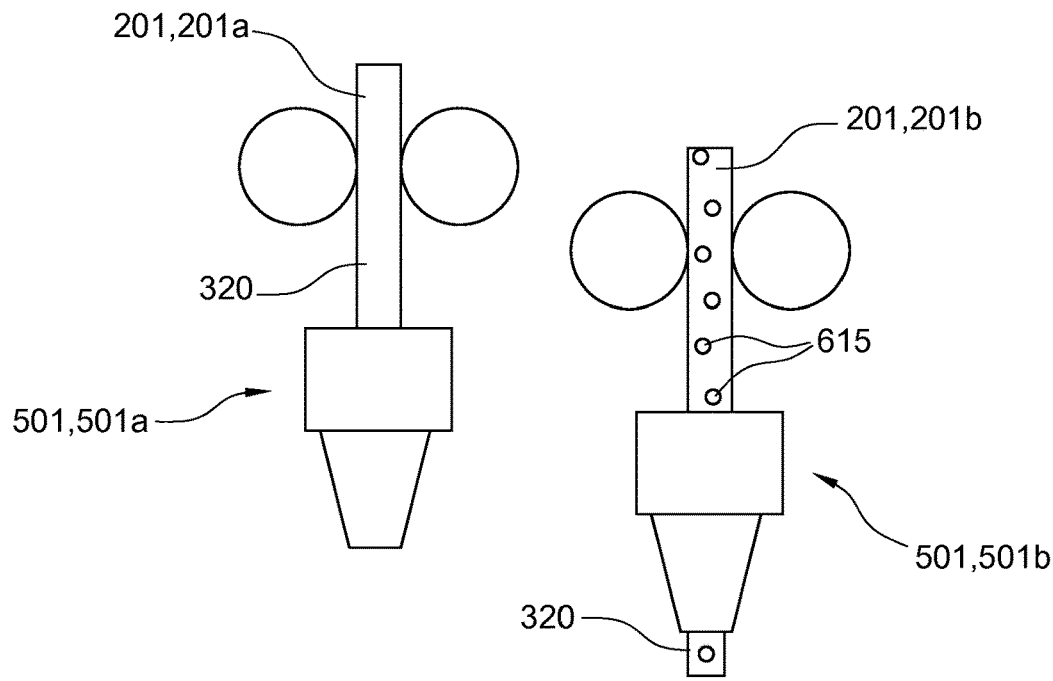

In further embodiments the method may comprise using a fused deposition modeling 3D printer comprising at least two nozzles 501, wherein the method comprises providing a first 3D printable material 201 through a first nozzle 501a and providing a second 3D printable material 201 comprising the functional material 615, such as cross-linkable material and/or initiator molecules to start or assist cross-linking, through a second nozzle 501b, and controlling supply of the 3D printable materials 201a,201b, see FIG. 1e. To this end, above-mentioned control system may be applied.

As indicated above, it is considered desirable to be able to produce relief structures, such as for the printing of optics. For this purpose, it would possible to use imprinting techniques. However, as FDM uses melting for the adhesion of subsequent layers the imprinted layer would get destroyed during the printing of the subsequent layer.

Hence, herein we suggest employing layers which (can show good adhesion but) can also be cross-linked or protected so that the imprinted layer is not destroyed. In general, layers which show good adhesion separate (at least partly) when they are subjected to a temperature shock, such as especially a lowering (or increase) of the temperature of at least 50° C., such as at least 100° C. For instance, materials that may be adhesive may separate at least partly when lowered to a temperature of −50° C., such as −100° C., like at liquid nitrogen temperature.

Figure 2A:
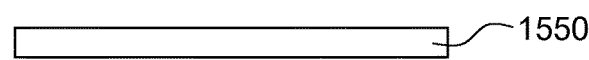
FIGS. 2a-2f schematically depicts an embodiment of the 3D printing method.
Figure 2B:
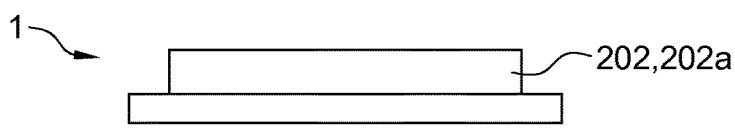
Figure 2C:
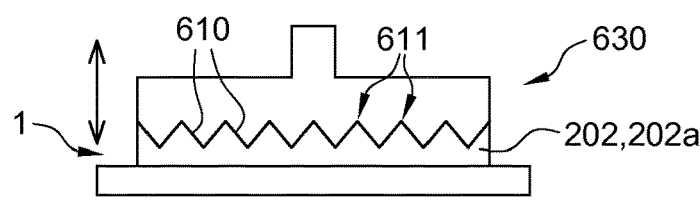
Figure 2D:
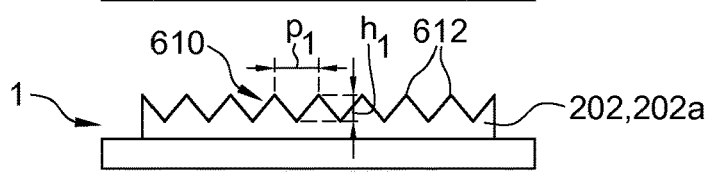
Figure 2E:
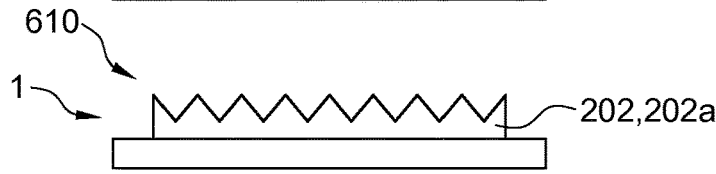
Figure 2F:
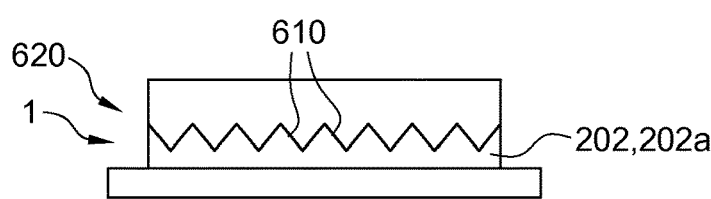

A primary 3D printed structure is applied on top of a substrate 1550 (FIGS. 2A and B). The primary 3D printed structure is imprinted by a stamp/mold with the application of heat and pressure (FIG. 2C). The stamp/mold is removed resulting in an imprinted 3D printed structure (FIG. 2D). The imprinted 3D printed structure is subsequently cross-linked or protected with a thin additional layer (e.g. sprayed on top of the imprinted 3D printed structure) resulting in a cross-linked or protected imprinted 3D printed structure (FIG. 2E). Next, a secondary 3D printed structure is applied on top of the cross-linked or protected imprinted 3D printed structure (FIG. 2F). Various methods and material combinations will further be described here below.

FIGS. 1a-1d and 2 schematically shows an embodiment of the method for 3D printing a 3D item 1, the method comprising depositing during a printing stage 3D printable material 201, to provide the 3D item 1 comprising 3D printed material 202, wherein the printing stage comprises: 3D printing first 3D printable material 201a to provide first 3D printed material 202a; creating a relief structure 610 in the first 3D printed material 202a with a tool 630; and 3D printing second 3D printable material 201b to provide second 3D printed material 202b, to provide a stack 620 of (i) 3D printed material 202 comprising the first 3D printed material comprising the relief structure 610, and (ii) the second 3D printed material 202b.

FIG. 2 also shows that the relief structure 610 may comprise tops 612 with indentations (or cavities), such as trenches, in between. By way of example, a regular structure is schematically depicted, with (the tops having) a period p1. The heights of the tops 612 relative to the indentations is indicated with reference h1. Hence, FIG. 2 (and other figures) also schematically depict regular patterns 611. As shown, in the regular structure 610 the height differences or heights h1 between tops and valleys (or between tops and cavities) are the same over the structure.

Figure 3:
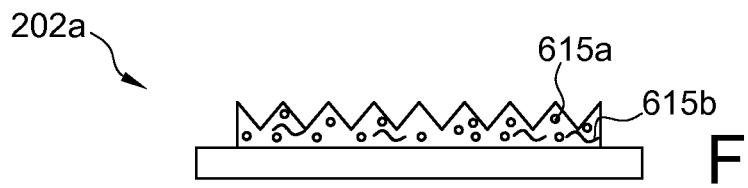
FIGS. 3-6 schematically depict some variants.

The primary imprint material (e.g. Acrylonitrile Butadiene Styrene ABS, Polylactic acid PLA, Polycarbonate PC, Polyamide PA, Polystyrene PS, lignin, rubber, etc.) may comprise an initiator to cross-link the material (e.g. upon application of irradiation such as UV light). The imprinted material is especially a thermoplastic polymer with functional groups which can be crosslinked using an initiator and application of radiation (FIG. 3). Reference 615a and 615b indicate initiator(s) and monomer(s), respectively.

Cross-linking can be done with techniques known in the art.

Figure 4:
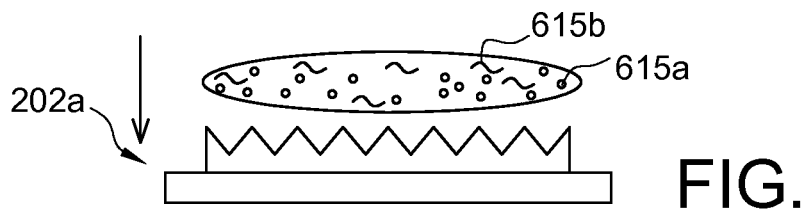

In another example, a monomer (such as an acrylate) and initiator can be applied (e.g. by spray-coating, spin-coating, dip-coating) to the primary 3D printed structure after 3D printed. The monomer and initiator can penetrate the primary 3D printed structure. Subsequently the primary 3D printed structure is cross-linked (FIG. 4).

Figure 5:
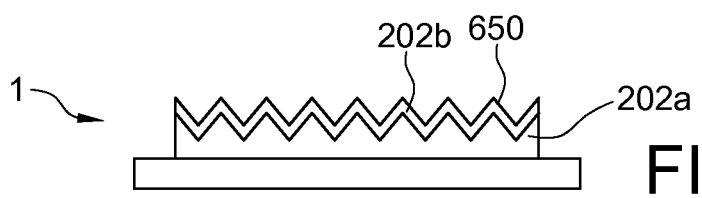

In yet another example, a protection layer can be applied to the primary 3D printed structure after 3D printed. For example, a dissolved polymer (such as an acrylate) in a solution can be applied (e.g. by spray-coating, spin-coating, dip-coating) to the primary 3D printed structure after 3D printed. The solvent is evaporated The monomer and initiator can penetrate the primary 3D printed structure. Subsequently the primary 3D printed structure is cross-linked (FIG. 5). In this way, a layer 650, especially a protective layer, may be provided.

Figure 6:
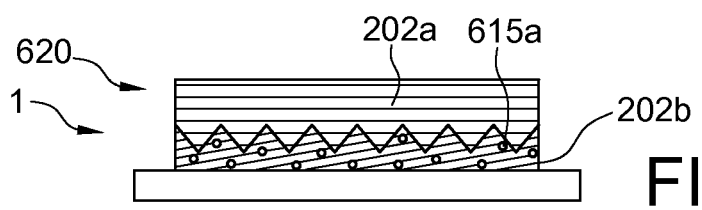

The primary imprint material may comprise an initiator to cross-link the material (e.g. upon application of irradiation such as UV light), while the secondary does not comprise an initiator (FIG. 6). In such embodiments, the first printable material and the second printable material may essentially be the same. After deposition and cross-linking, the first printed material 202a and the second printed material 202b are different (as the former comprises cross-linked material, and the second does not or does not necessarily comprise (the same type of) cross-linked material).

Figure 7:
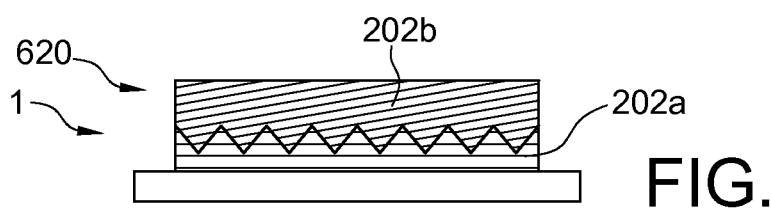
FIGS. 7-15 schematically depict some further variants.

The primary and secondary imprint material may be different. For example, they may consist of a different thermoplastic material (FIG. 7). In such embodiments, the first printable material and the second printable material may essentially be different. For instance, one or more of the glass temperature and melting temperature may differ for the printable materials and thus also the 3D printed materials.

Figure 8:
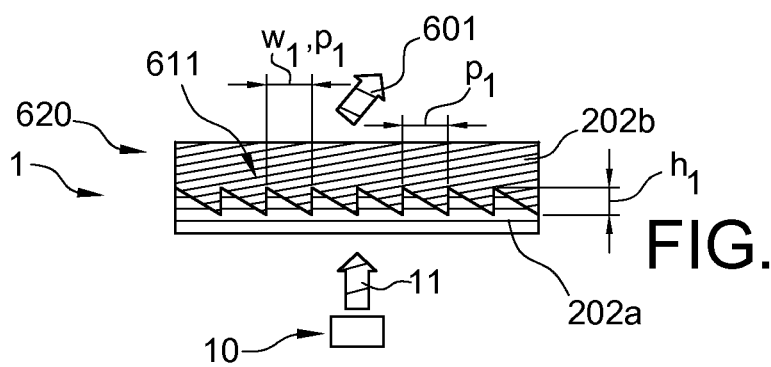
Figure 9:
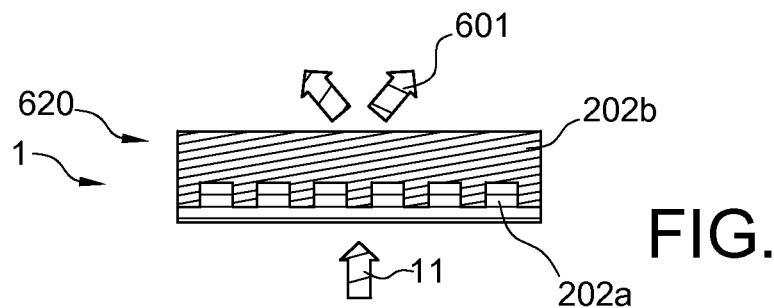

The primary and secondary imprint material may differ in refractive index. By using a difference in refractive index a diffractive optical component is obtained (FIG. 8). It goes without saying that instead of a refractive structure a diffractive structure can be imprinted resulting in a diffractive component (FIG. 9). Hence, FIGS. 8 and 9, but also other figures, shown embodiments of the relief structure 610 comprises a regular pattern 611 of tops 612 having widths w1, having heights h1, and having a period p1. For instance, one or more of the widths w1, heights h1 and period p1 are selected from the range of 100 nm-100 µm, which may especially be useful for optical applications with visible light. Therefore, especially one or more of the first 3D printable material and the second printable material have a transmission of at least 90%/cm 3D printable material for one or more wavelengths in the visible. This may result in that one or more of the first 3D printed material 202a and the second printed material 202b have a transmission of at least 90%/cm 3D printed material 202 (202a and/or 202b, respectively) for one or more wavelengths in the visible. Reference 11 indicates light source light of a light source 10; reference 601 indicates light emanating from the 3D item.

Figure 10:
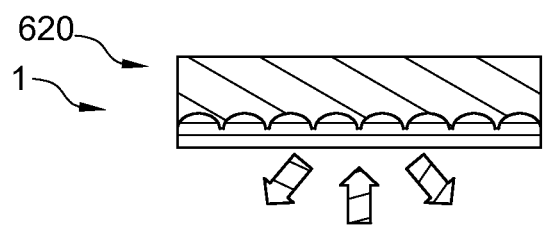

The primary and secondary imprint material may differ in reflectivity. By using a difference in reflective materials a reflective optical component is obtained (FIG. 10).

Figure 11:
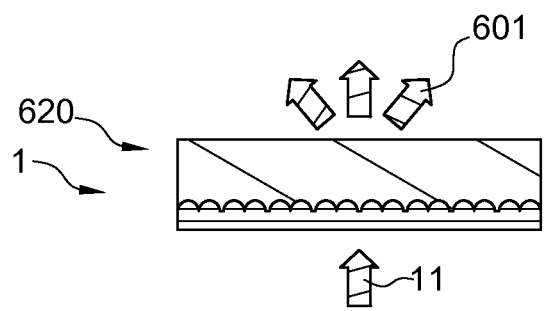

The primary and secondary imprint material may differ in scattering. By using a difference in scattering materials a scattering optical component is obtained (FIG. 11).

Figure 12:
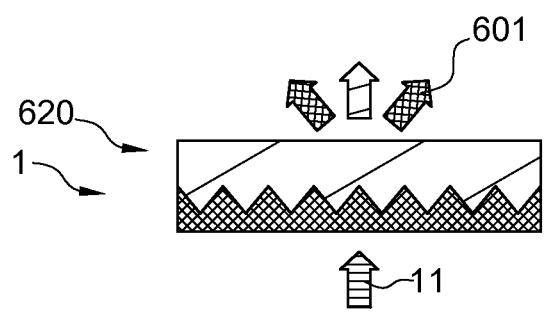

The primary and secondary imprint material may differ in concentration of luminescent material. By using a difference in concentration of luminescent materials (concentration) a conversion component is obtained (FIG. 12).

Figure 13:
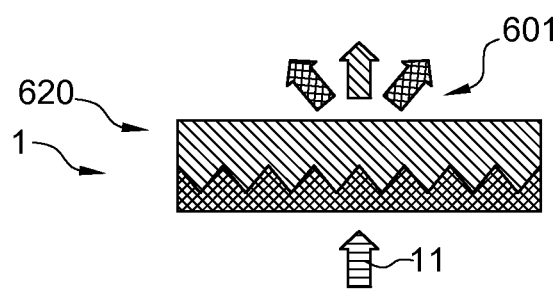

The primary and secondary imprint material may differ in type of luminescent material. By using a difference in type of luminescent materials (concentration) a conversion component is obtained (FIG. 13).

Figure 14:
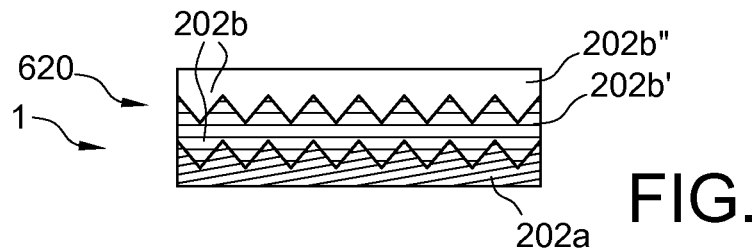

It goes without saying that more than two layers can be applied on top of each other such as 3 layers i.e. having a tertiary imprint material (FIG. 14). Here, this is indicated as two different types of second 3D printed material 202b' and 202b", respectively. Of course, also two (or more) different types of first 3D printed material 202a may be applied (not depicted).

Figure 15:
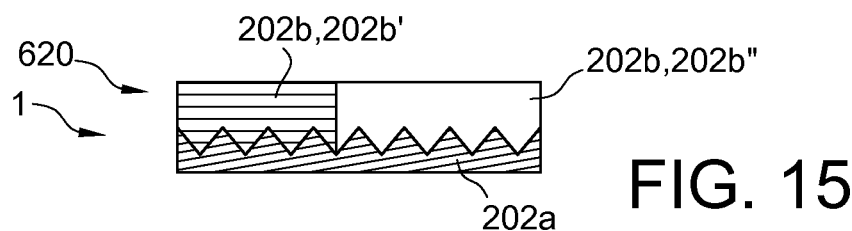

It goes without saying that two different secondary layers can be applied on top of the primary layer (FIG. 15).

Amongst others, we suggest a lamp using the imprinted 3D printed structure, a light engine using the imprinted 3D printed structure, a luminaire using the imprinted 3D printed structure, etc. etc.

Figure 16:
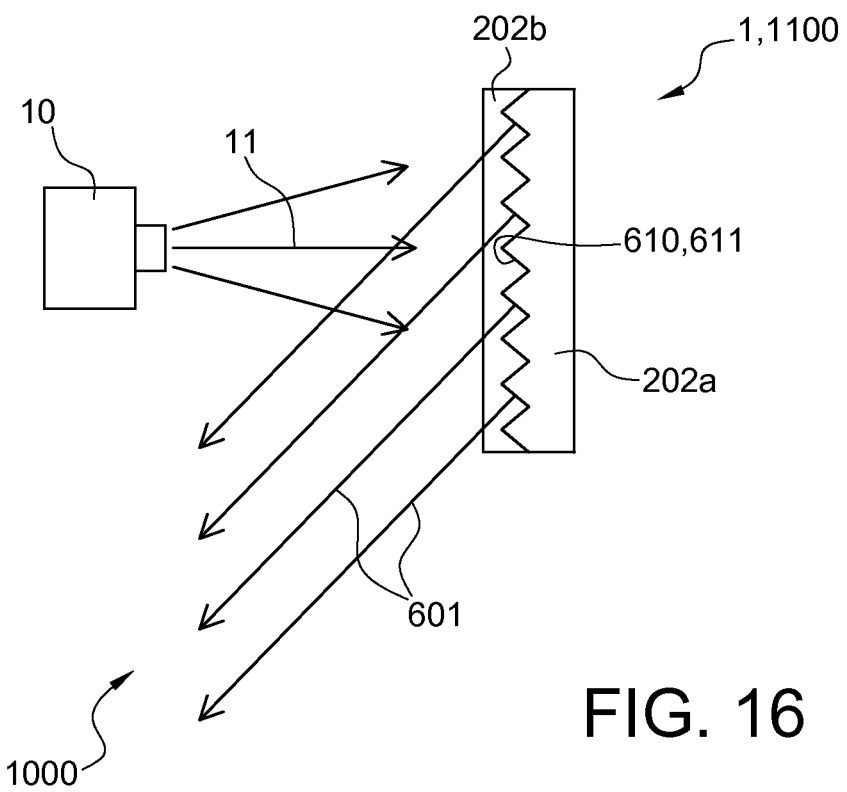
FIG. 16 schematically depicts an embodiment of a lighting system.

FIG. 16 schematically depicts an embodiment of a lighting system 1000 comprising a light source 10 configured to provide light source light 11 and b an optical element 1100 comprising the 3D item 1, wherein the optical element 1100 is configured to receive at least part of the light source light 11. Light emanating of the optical element is indicated with reference 601

The term "substantially" herein, such as "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

It goes without saying that one or more of the first (printable or printed) material and second (printable or printed) material may contain fillers such as glass and fibers which do not have (to have) influence on the on $T_g$ or $T_m$ of the material(s).

The invention claimed is:

1. A method for 3D printing a 3D item by means of fused deposition modeling, the method comprising depositing during a printing stage 3D printable material, to provide the 3D item comprising 3D printed material, wherein the printing stage comprises:
   3D printing a first 3D printable material to provide a first 3D printed material, the first 3D printable material comprising a cross-linkable material;
   creating a relief structure in the first 3D printed material with a tool; and
   3D printing a second 3D printable material to provide a second 3D printed material, to provide a stack of (i) 3D printed material comprising the first 3D printed material comprising the relief structure, and (ii) the second 3D printed material,
   wherein the method further comprises:
   cross-linking at least part of the first 3D printed material comprising the relief structure before depositing the second 3D printable material.

2. The method according to claim 1, further comprising providing a layer on at least part of the first 3D printed material comprising the relief structure before depositing the second 3D printable material.

3. The method according to claim 1, further comprising cross-linking at least part of the second 3D printed material adjacent to the relief structure.

4. The method according to claim 1, comprising creating the relief structure in the first 3D printed material with a stamp.

5. The method according to claim 1, wherein the relief structure comprises a regular pattern of tops having widths (w1), having heights (h1), and having a period (p1), wherein one or more of the widths (w1), heights (h1) and period (p1) are selected from the range of 100 nm-100 µm.

6. The method according to claim 1, wherein one or more of the first 3D printable material and the second printable material have a transmission of at least 90%/cm 3D printable material for one or more wavelengths in the visible.

7. The method according to claim 1, wherein the first 3D printable material and the second 3D printable material differ in one or more of (i) index of refraction, (ii) type of scattering particles, (iii) concentration of scattering particles, (iv) type of luminescent material, (v) concentration of luminescent material, and (vi) one or more of the glass temperature and melting temperature.

8. A 3D item obtainable by the method according to claim 1, wherein the 3D item comprises a stack of (i) a first 3D printed material comprising a relief structure, and (ii) a second 3D printed material, wherein the first 3D printed material and the second 3D printed material differ in chemical composition, the first 3D printed material comprising cross-linked material.

9. The 3D item according to claim 8, wherein the relief structure comprises a regular pattern of tops having widths (w1), having heights (h1), and having a period (p1), wherein one or more of the widths (w1), heights (h1) and period (p1) are selected from the range of 100 nm-100 µm.

10. The 3D item according to claim 8, wherein one or more of the first 3D printed material and the second printed material have a transmission of at least 90%/cm 3D printed material for one or more wavelengths in the visible.

11. The 3D item according to claim 10, wherein the first 3D printed material and the second 3D printed material differ in one or more of (i) index of refraction, (ii) type of scattering particles, (iii) concentration of scattering particles, (iv) type of luminescent material, (v) concentration of luminescent material, and (vi) one or more of the glass temperature and melting temperature.

12. A lighting system comprising (a) a light source configured to provide light source light and (b) an optical element comprising the 3D item according to claim 10, wherein the optical element is configured to receive at least part of the light source light.

* * * * *